United States Patent
Iyer et al.

(10) Patent No.: US 10,341,292 B2
(45) Date of Patent: *Jul. 2, 2019

(54) INCREASED PORT ADDRESS SPACE (71) Applicant: Avi Networks, Santa Clara, CA (US)

(72) Inventors: Sreeram Iyer, Cupertino, CA (US);
Kiron Haltore, San Jose, CA (US);
Murali Basavaiah, Sunnyvale, CA (US)

(73) Assignee: Avi Networks, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/168,626

(22) Filed: Oct. 23, 2018

(65) Prior Publication Data
US 2019/0068548 A1    Feb. 28, 2019

Related U.S. Application Data (63) Continuation of application No. 15/685,710, filed on Aug. 24, 2017, now Pat. No. 10,148,613, which is a continuation of application No. 14/338,228, filed on Jul. 22, 2014, now Pat. No. 9,781,075.

(60) Provisional application No. 61/857,507, filed on Jul. 23, 2013.

(51) Int. Cl.
H04L 29/12      (2006.01)
H04L 12/803     (2013.01)
H04L 12/937     (2013.01)
H04L 12/26      (2006.01)
H04L 12/931     (2013.01)

(52) U.S. Cl.
CPC .......... *H04L 61/2564* (2013.01); *H04L 43/08* (2013.01); *H04L 47/125* (2013.01); *H04L 49/253* (2013.01); *H04L 61/2061* (2013.01); *H04L 61/2517* (2013.01); *H04L 61/6063* (2013.01); *H04L 49/602* (2013.01)

(58) Field of Classification Search
CPC . H04L 61/2564; H04L 61/2517; H04L 43/08; H04L 49/253; H04L 61/2061; H04L 61/6063; H04L 47/125; H04L 49/602
USPC .......................................................... 709/228
See application file for complete search history.

(56) References Cited

U.S. PATENT DOCUMENTS

| 6,353,614 | B1 | 3/2002 | Borella |
| 6,457,061 | B1 | 9/2002 | Bal |
| 7,283,517 | B2 | 10/2007 | Yan |
| 7,701,843 | B1 | 4/2010 | Licari |
| 8,856,138 | B1 | 10/2014 | Neubeck |
| 9,774,707 | B2 | 9/2017 | Parthasarathy |

(Continued)

OTHER PUBLICATIONS

Gary R Wright, and W Richard Stevens, TCP/IP Illustrated, vol. 2, The Implementation, Adison Wesley Publishers, Section 22.7: in_pcb-bind Function, Feb. 10, 1995.

(Continued)

*Primary Examiner* — David R Lazaro
*Assistant Examiner* — Berhanu Shitayewoldetadik
(74) *Attorney, Agent, or Firm* — Van Pelt, Yi & James LLP (57) ABSTRACT

Network session identification information is received. The network session identification information is associated with a destination IP address and a destination network port. An available source network port for a new session to be established for a source IP address is determined based on the destination IP address and the destination network port.

20 Claims, 6 Drawing Sheets

(56) References Cited

U.S. PATENT DOCUMENTS

| | | | |
|---|---|---|---|
| 2002/0067859 A1* | 6/2002 | Nicholson | G06K 9/00442 |
| | | | 382/229 |
| 2002/0080775 A1* | 6/2002 | Engbersen et al. | H04L 12/66 |
| | | | 370/351 |
| 2002/0095512 A1 | 7/2002 | Rana | |
| 2002/0152325 A1 | 10/2002 | Elgebaly | |
| 2004/0093329 A1* | 5/2004 | Von Bergen | G06F 16/24545 |
| 2004/0268357 A1* | 12/2004 | Joy | H04L 29/06 |
| | | | 718/105 |
| 2005/0074000 A1* | 4/2005 | Yokoyama | H04L 47/125 |
| | | | 709/249 |
| 2007/0067834 A1* | 3/2007 | Saito | H04L 63/08 |
| | | | 726/9 |
| 2008/0215669 A1 | 9/2008 | Gaddy | |
| 2008/0259797 A1* | 10/2008 | Gruper | H04L 45/00 |
| | | | 370/235 |
| 2008/0304499 A1* | 12/2008 | Jeon | H04L 12/66 |
| | | | 370/401 |
| 2009/0055543 A1 | 2/2009 | Rasanen | |
| 2009/0285175 A1 | 11/2009 | Nix | |
| 2010/0023629 A1 | 1/2010 | Lennaerta | |
| 2011/0072148 A1* | 3/2011 | Begen et al. | 709/231 |
| 2012/0023257 A1* | 1/2012 | Vos | H04L 29/12377 |
| | | | 709/232 |
| 2015/0244804 A1 | 8/2015 | Warfield | |
| 2017/0374023 A1 | 12/2017 | Iyer | |

OTHER PUBLICATIONS

Jon Postel. Transmittal Control Protocol, Darpa Internet Program, Protocal Specification, Sep. 1981.

* cited by examiner

INCREASED PORT ADDRESS SPACE

CROSS REFERENCE TO OTHER APPLICATIONS

This application is a continuation of co-pending U.S. patent application Ser. No. 15/685,710, entitled INCREASED PORT ADDRESS SPACE filed Aug. 24, 2017 which is incorporated herein by reference for all purposes, which is a continuation of U.S. patent application Ser. No. 14/338,228, entitled INCREASED PORT ADDRESS SPACE filed Jul. 22, 2014, now U.S. Pat. No. 9,781,075, which is incorporated herein by reference for all purposes, which claims priority to U.S. Provisional Application No. 61/857,507, entitled INCREASED PORT ADDRESS SPACE filed Jul. 23, 2013 which is incorporated herein by reference for all purposes.

BACKGROUND OF THE INVENTION

Often each network session of a computer device must to be assigned to a unique network port of the computer device. For example, when a network session is initiated the computer device must assign a unique source network port of the computer device to the network session. In common network protocols such as TCP (i.e., Transmission Control Protocol)/IP (i.e., Internet Protocol), the network port is identified using a 16 bit identifier. Consequently, there is often a theoretical maximum of $2^{16}=65,536$ (64K) concurrent connections that are able to be utilized by the computer device. However, some ports are often reserved for specific purposes and the number of available ports for a particular protocol is likely closer to 48K. As computer devices become more connected and network utilization is exponentially increasing, a computer device can exhaust the number of available source network ports when network connection session demand is high. In order to accommodate even a larger number of network ports, the computer device may utilize multiple IP addresses, each with its unique set of source network ports. However, utilizing and managing multiple IP addresses for a single computer device may be challenging and in even some cases additional IP addresses may not be available for use. Therefore, there exists a need for a better way to increase the number of available concurrent network session connections.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Often the limitation of the number of connections stems from the ephemeral source port (e.g., source ports that are randomly chosen by the networking stack for client endpoints) allocation scheme in TCP/IP stacks. The source ports are typically allocated from a single pool of ports (e.g., the number of valid source ports is often theoretically 64K, but due to practical limitations of reserving some of these ports for well-known services, the number of usable connections reduces even further, and is typically about 48K). In many existing implementations, the number can be even as low as 16K.

For the TCP/IP protocol, the 4-tuple of <Source-IP, Source-Port, Destination-IP, Destination-Port> identifies a network session connection uniquely. In some embodiments, the source port is allocated from a pool of ports shared only among sessions to the same destination IP address and destination port number. Thus, through this approach, a single client with a single IP address can utilize the entire pool of source port numbers for each unique destination IP address and destination port number rather than share a single pool of source port numbers across all destination IP addresses and destination port numbers.

Maintaining session information is disclosed. In some embodiments, session identification information is received. For example, the destination IP address and destination network port of a network session to be established is received. An available source network port is determined using a data structure that is based on a destination IP address and destination network port associated with the session identification information. For example, rather than requiring all network sessions of a device to be assigned to a unique source network port number across all network sessions, a source network port is only required to be unique for each pair of destination IP address and destination network port. In order to track which source network port is available for use for each destination IP address and destination network port, one or more data structures that track availability of source network ports for at least each unique combination of destination IP address and port may be utilized.

Figure 1:
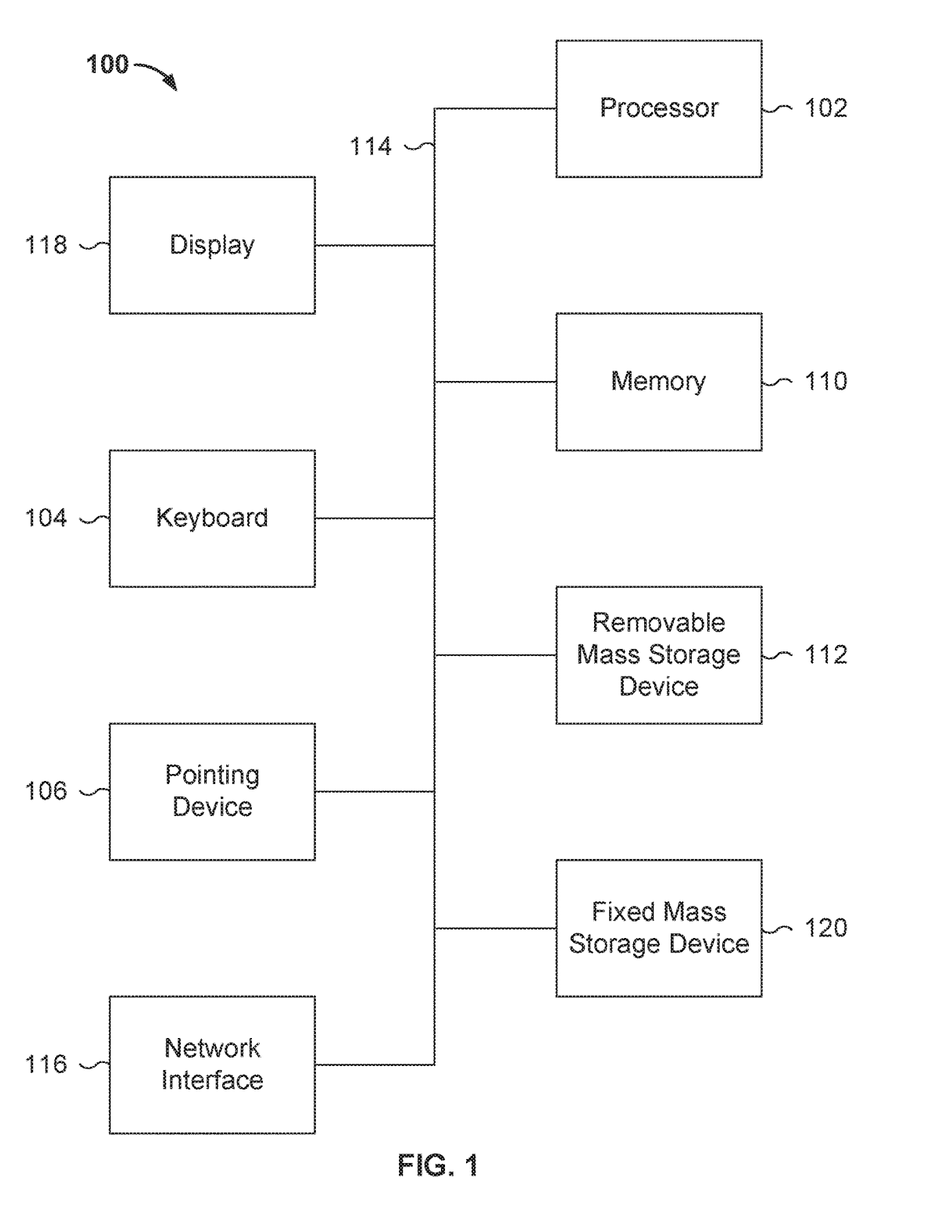
FIG. 1 is a functional diagram illustrating a programmed computer system for handling network sessions in accordance with some embodiments.

FIG. 1 is a functional diagram illustrating a programmed computer system for handling network sessions in accordance with some embodiments. As will be apparent, other computer system architectures and configurations can be used to perform distributed load balancing functions. Computer system 100, which includes various subsystems as described below, includes at least one microprocessor subsystem (also referred to as a processor or a central processing unit (CPU)) 102. For example, processor 102 can be implemented by a single-chip processor or by multiple processors. In some embodiments, processor 102 is a general purpose digital processor that controls the operation of the computer system 100. Using instructions retrieved from memory 110, processor 102 controls the reception and manipulation of input data, and the output and display of data on output devices (e.g., display 118). In various embodiments, processor 102 supports standard operating systems as well as virtual machine (VM)-based operating systems. In some embodiments, processor 102 includes and/or is used to implement one or more service engines and/or servers as discussed below, as well as to execute/perform the various processes described below.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data, and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
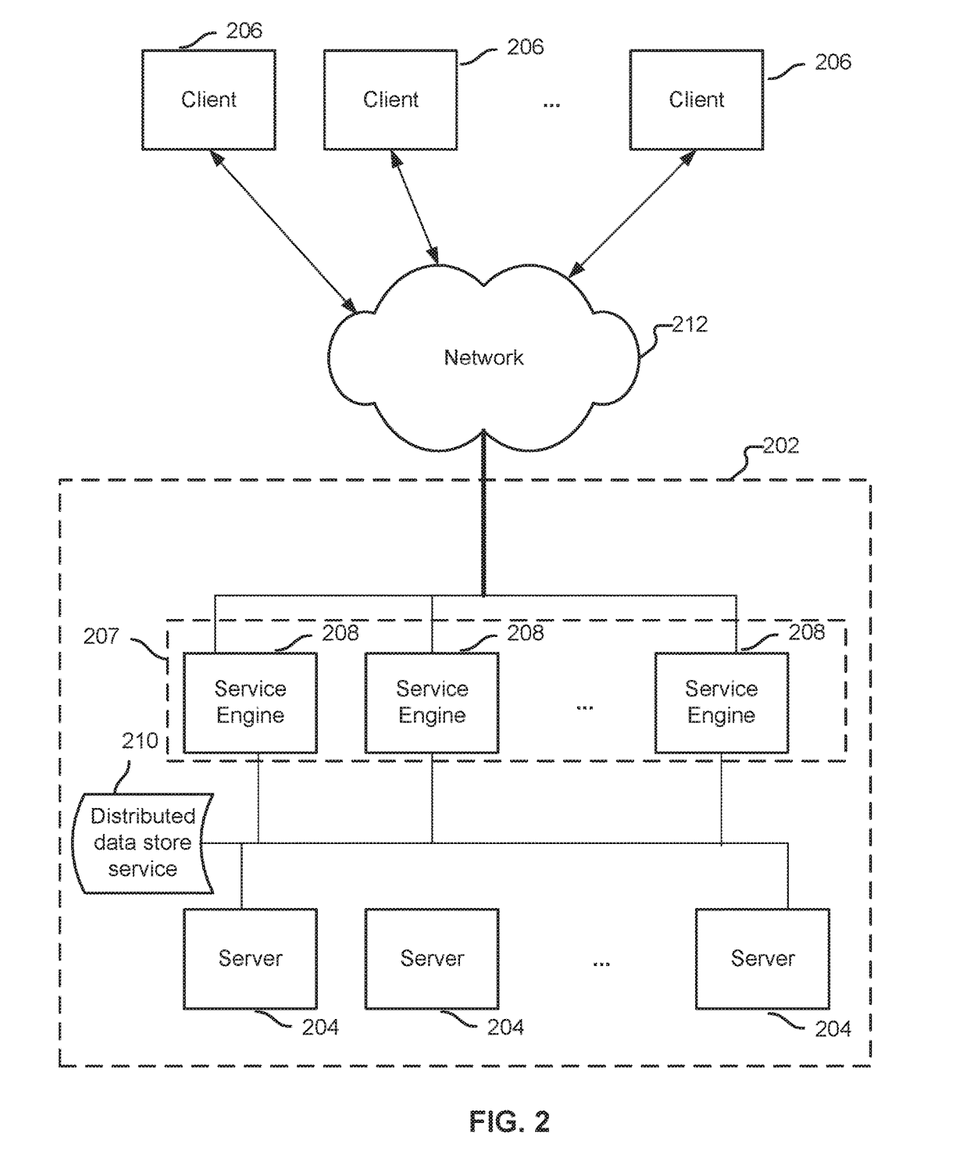
FIG. 2 is a block diagram illustrating an embodiment of a system for load balancing communication sessions.

FIG. 2 is a block diagram illustrating an embodiment of a system for load balancing communication sessions. In the example shown, client devices 206 can be computers, tablets, smartphones, mobile devices, wearable computers, or any other appropriate devices. Platform 202 can be within a data center network or other service provider network. A number of servers 204 are configured to provide network-based applications, services, and/or data to client devices 206. In some embodiments, each server is implemented on a separate physical device. In some embodiments, multiple servers share the same physical device. In the example shown, separate physical devices communicate via communication interfaces such as buses, cables, optical or wireless interfaces, and/or a network such as intranets, local area networks (LANs), wide area networks (WANs), radio access networks (RANs), Wi-Fi networks, the Internet, and the like. In some embodiments, the servers operate within standard operating systems (e.g., Linux™, Windows™, etc.) on physical devices; in some embodiments, the servers operate within operating systems on virtual machines (VMs) (e.g., virtual machines supported by a hypervisor).

At least one of clients 206 may request to establish a connection with at least one of servers 204 to gain access to one or more applications, services, and/or data. Depending on the application of the client requesting the server and the protocol used, the connection request can take on a variety of forms. For example, a web browser of the client can fetch a webpage or other resource from a web server; an email client can connect to an email server to send/receive emails; a file sharing client can connect to a file sharing server to share files; a collaboration client can connect to a collaboration server to collaborate on documents, etc.

In the example shown, load balancer 207 includes a plurality of service engines 208. Each service engine may be implemented on a physical device or a virtual machine; multiple service engines may execute on separate physical devices or share the same physical device. Each service engine implements distributed load balancing functions, which can be implemented in software code, in hardware (e.g., using application specific integrated circuits (ASIC)), or a combination. The initial connection request from a client 206 can be received by any service engine 208. To evenly distribute resources, each service engine 208 performs load balancing functions to direct the connection to a selected one of the servers based on a load balancing algorithm. A variety of load balancing algorithms may be implemented. Service engines 208 may cooperate to function as a single load balancer to distribute connections received on network 212 to servers 204. In some embodiments, network 212 connects service engines 208 to servers 204. Network 212 may be any combination of public or private networks, including intranets, local area networks (LANs), wide area networks (WANs), radio access networks (RANs), Wi-Fi networks, the Internet, and the like.

In an alternative example, rather than utilizing a plurality of service engines 208, a single load balancer network component/device is utilized as load balancer 207. For example, there exists a single point of contact where requests for servers 204 are received from clients 206.

Figure 3:
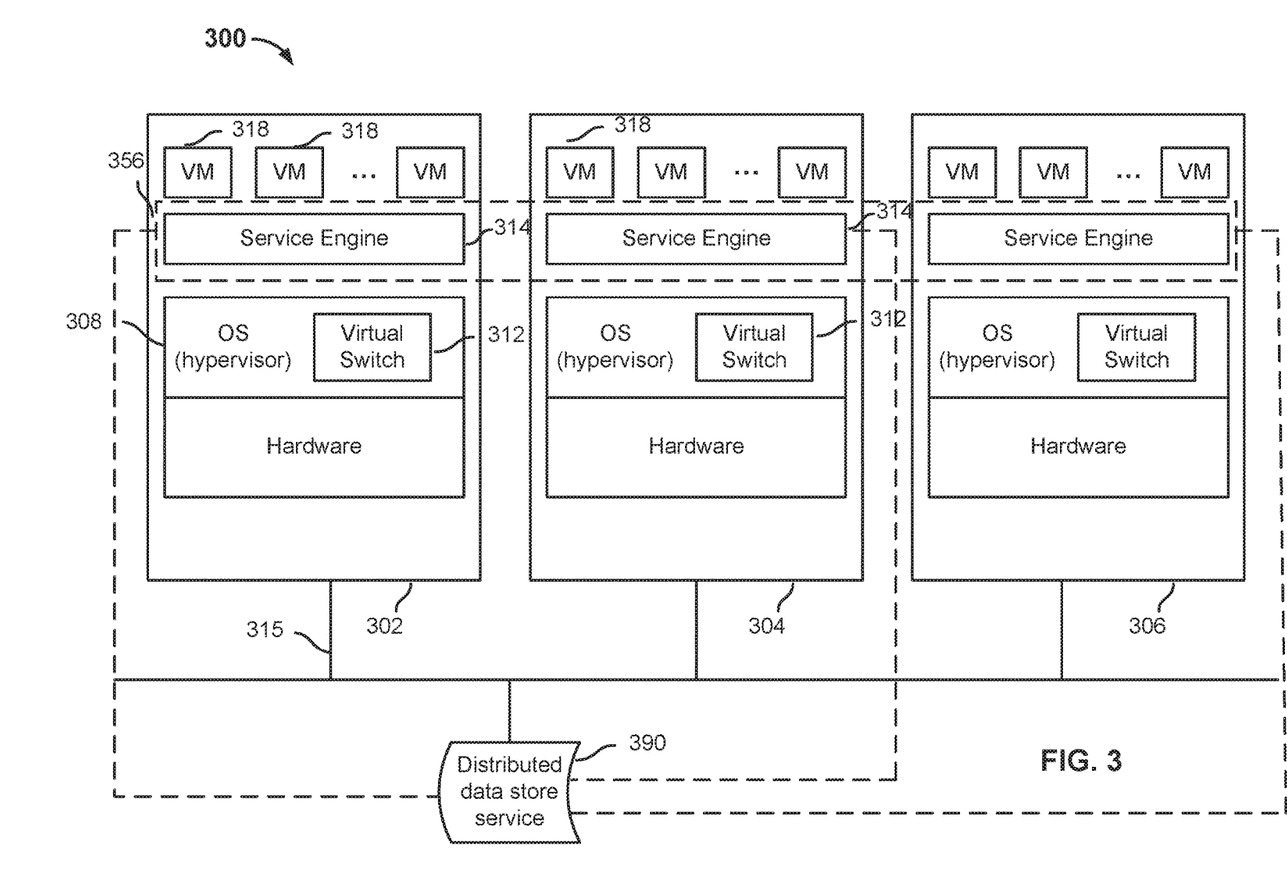
FIG. 3 is a block diagram illustrating an embodiment of a virtualized distributed load balancer.

FIG. 3 is a block diagram illustrating an embodiment of a virtualized distributed load balancer. One or more components of FIG. 3 may be included in load balancer 207 and/or service engines 208 of FIG. 2. In this example, platform 300 includes a number of devices (e.g., multiple server computers or a multicore server comprising multiple processing cores). A physical device (e.g., 302, 304, 306, etc.) has hardware components and software components, and may be implemented using a device such as 100. In particular, hardware of the device supports operating system software in which a number of virtual machines (VMs) 318 are configured to execute. A VM is a software implementation of a machine (e.g., a computer) that simulates the way a physical machine executes programs. The part of the device's operation system that manages the VMs is referred to as the hypervisor (308). The hypervisor interfaces between the physical hardware and the VMs, providing a layer of abstraction to the VMs. Through its management of the VMs' sharing of the physical hardware resources, the hypervisor makes it appear as though each VM were running on its own dedicated hardware. Examples of hypervisors include VMware Workstation® and Oracle VM VirtualBox®.

In this example, clients (not shown) communicate with servers, which are configured as VMs executing instances of network applications. Examples of such network applications include web applications such as, shopping cart, user authentication, credit card authentication, email, file sharing, virtual desktops, voice/video streaming, online collaboration, etc. Many other network applications can be implemented. As will be described in greater detail below, a distributed network service layer is formed to provide multiple application instances executing on different physical devices with network services. As used herein, network services refer to services that pertain to network functions, such as load balancing, authorization, security, content acceleration, analytics, application management, etc. A network service layer providing load balancing functions is described in detail below. As used herein, an application that is serviced by the distributed network service is referred to as a target application. Multiple instances of an application (e.g., multiple processes) can be launched on multiple VMs.

Inside the hypervisor there are multiple modules providing different functionalities. One of the modules is a virtual switch 312. A physical hardware has one or more physical ports (e.g., Ethernet ports). Network traffic (e.g., data packets) can be transmitted or received by any of the physical ports, to or from any VMs. The virtual switch is configured to direct traffic to and from one or more appropriate VMs, such as the VM in which the service engine on the device is operating.

One or more service engines 314 are instantiated on a physical device. In some embodiments, a service engine is implemented as software executing in a virtual machine. The service engine is executed to provide distributed network services for applications executing on the same physical server as the service engine, and/or for applications executing on different physical servers. In some embodiments, the service engine is configured to enable appropriate service components that implement service logic. In some embodiments, a load balancer component is executed within a service engine to provide load balancing logic, specifically to distribute traffic load amongst instances of target applications executing on the local physical device as well as other physical devices. In some embodiments, other types of service components such as a firewall may be implemented and enabled as appropriate. When a specific service is desired, a corresponding service component is configured and invoked by the service engine to execute in a VM. A distributed load balancer comprising multiple load balancer components is described in detail below.

A virtual switch such as 312 interacts with the service engines, and uses existing networking Application Programming Interfaces (APIs) (such as APIs provided by the operating system) to direct traffic and provide distributed network services for target applications deployed on the network. The operating system and the target applications implement the API calls (e.g., API calls to send data to or receive data from a specific socket at an Internet Protocol (IP) address). In some embodiments, the virtual switch is configured to be in-line with one or more VMs and intercepts traffic designated to and from instances of the target applications executing on the VMs. When a networking API call is invoked, traffic is intercepted by the in-line virtual switch, which directs the traffic to or from the appropriate VM on which instances of the target application execute. In some embodiments, a service engine sends data to and receives data from a target application via the virtual switch.

In some embodiments, a controller (not shown) is configured to control, monitor, program, and/or provision the distributed network services and virtual machines. In particular, the controller is configured to control, monitor, program, and/or provision a group of service engines, and is configured to perform functions such as bringing up the service engines, downloading software onto the service engines, sending configuration information to the service engines, monitoring the service engines' operations, detecting and handling failures, and/or collecting analytics information. The controller can be implemented as software, hardware, firmware, or any combination thereof.

In the example shown, a distributed data store service 390 is used to store data and facilitate the synchronization of load balancing state information across service engines. The service engines and the distributed data store service cooperate to function as a single entity, forming a distributed network service layer 356 to provide services to the target applications. In other words, although multiple service engines 314 are installed and running on multiple physical devices, they cooperate to act as a single layer 356 across these physical devices. In some embodiments, the service engines cooperate by sharing state information (e.g., load balancing state information) using distributed data store service 390.

In some embodiments, a single service layer is presented to the target applications to provide the target applications with services. The interaction between the target applications and service layer is transparent in some cases. In this example, a load balancing service is provided by the service layer, and the target application sends and receives data via existing APIs as it would with a standard, non-distributed load balancing device. In other words, from the perspective of a client or a server-side application targeted by the client, it is as if a single service layer object (specifically, a single load balancer) were instantiated and with which the client or target application communicated, even though in some implementations multiple service engine objects (with multiple load balancing components) execute on multiple devices.

Traffic received on a physical port of a server (e.g., a communications interface such as Ethernet port 315) is sent to the virtual switch (e.g., 312). In some embodiments, the virtual switch is configured to use an API provided by the hypervisor to intercept incoming traffic designated for the target application(s) in an in-line mode, and send the traffic to an appropriate service engine. In in-line mode, packets are forwarded on without being replicated. As shown, the virtual switch passes the traffic to a service engine in the distributed network service layer (e.g., the service engine on the same physical device), which transforms the packets if needed and redirects the packets to the appropriate target application. The service engine (in particular the load balancing component within the service engine) performs load balancing functions. Specifically, based on load balancing factors such as configured rules and operating conditions, the service engine redirects the traffic to an appropriate target application executing in a VM on a server.

Figure 4:
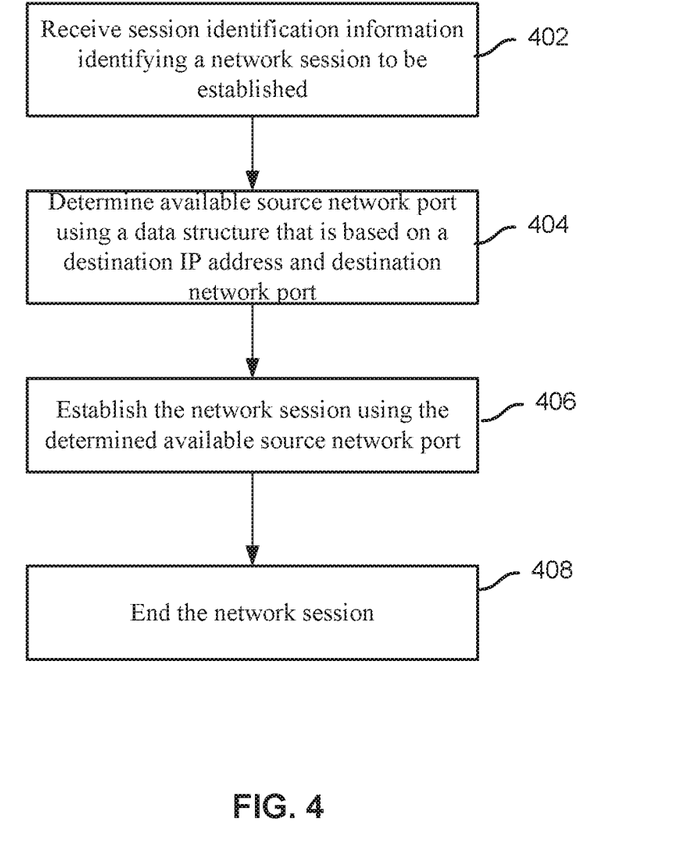
FIG. 4 is a flowchart illustrating an embodiment of a process for establishing a network session using an expanded source port number space.

FIG. 4 is a flowchart illustrating an embodiment of a process for establishing a network session using an expanded source port number space. The process of FIG. 4 may be implemented on computer system 100 of FIG. 1, any networked component of FIG. 2, and/or any physical or virtual device shown in FIG. 3. In some embodiments, the process of FIG. 4 is implemented on a networked client (e.g., user device, personal computer, laptop computer, tablet computer, mobile device, wearable computer, and any other networked device), a server, a firewall, a network proxy, and/or a load balancer.

At 402, session identification information identifying a network session to be established is received. In some embodiments, the network session is requested by a service and/or an application of a networked client and/or server. In some embodiments, the session identification information includes one or more packet header data items of a network packet to be sent via the network session. In some embodiments, the session identification information includes one or more of the following: a network destination identifier, a destination IP address, a destination network port, a network source identifier, a source IP address, a source network port, and a network protocol identifier. For example, an application desires to send data via a network to a network destination and information identifying a network connection to be established with the network destination is received. In some embodiments, the source IP address is the IP address of a communication sender, the source network port is the network port of the communication sender, the destination IP address is the IP address of a communication recipient, and the destination network port is the network port of the communication recipient. In some embodiments, the session identification information includes information that is utilized to determine information required to establish a network session connection. For example, a uniform resource identifier (URI) is received and the IP address and the network port of the URI are determined.

In some embodiments, the network session to be established utilizes Internet Protocol version 4 (IPv4). In some embodiments, the network session to be established utilizes Internet Protocol version 6 (IPv6). In some embodiments, the session identification information is associated with a particular network protocol to be utilized. Examples of the network protocol include Transmission Control Protocol (TCP), User Datagram Protocol (UDP), and Stream Control Transmission Protocol (SCTP). In some embodiments, one or more parameters of the network session to be established are automatically determined. For example, a destination network port to utilize is preconfigured for a particular protocol to be utilized (e.g., port 80 for TCP/IP).

In some embodiments, the session identification information is determined based at least in part on a received network request. For example, a proxy server receives a network request for content from a client and the proxy server determines the session identification information (received in 402) using the received network request. In some embodiments, the network session to be established is to be established by a load balancer. For example, the load balancer establishes the network session to proxy and/or forward network traffic. In some embodiments, the network session to be established is to be established by a firewall. For example, the firewall establishes the network session to proxy and/or forward network traffic.

At 404, an available source network port is determined using a data structure that is based on a destination IP address and destination network port. For example, the data structure that tracks available source ports for the destination IP address and destination port is identified using the received session information that includes the destination IP address and destination network port. In some embodiments, the data structure tracks which source network ports (e.g., which port numbers) are available for a new network session within the source port number space for the specific destination IP address and destination network port. For example, rather than tracking available source network ports that are shared across an entire communication source IP address, the range of source network ports is shared only across at least the same destination IP address and destination network port of a particular source IP address. This allows a communication sender with a particular source IP address to reutilize concurrently the same source network port number and same source IP address for different combinations of destination IP addresses and destination network port numbers.

In some embodiments, a different data structure that tracks available source network ports is maintained for at least each different pair of destination IP address and destination network port (e.g., tracked using separate data structures or different portions of a single data structure). In some embodiments, a different data structure that tracks available source network ports is maintained for different combinations of one or more of the following: destination IP address, destination network port, source IP address, and network protocol (e.g., tracked using separate data structures or different portions of a single data structure). For example, a communication sender is associated with a plurality of IP addresses and may utilize any of the plurality of IP addresses as the source IP address of a network packet by separately tracking available source network ports for each of the plurality of IP addresses. In some embodiments, a portion of the entire range of source network ports tracked by the data structure is not available to be provided as an available port because the portion of the source network ports has been reserved. For example, specific network ports have been reserved for specific use (i.e., not available to be provided for use from a general pool of available source network ports) across all network ports (e.g., reserved in each data structure for every destination IP address and destination network port combination) and a source network port is only available to be selected from ports that are not reserved. In some embodiments, the available range of network ports is based at least in part on a number of bits available to be used to represent an identifier of the network port. For example, TCP/IP protocol specifies that 16 binary bits is to be utilized to reference network port numbers (e.g., 2^16 ports are available excluding reserved ports), and this entire range of source network port numbers (e.g., excluding reserved ports) is available for each unique combination of one or more of the following: destination IP address, destination network port, network protocol and source IP address.

Examples of the data structure include a list, a table, a bitmap, a hash table, a tree, a database, and any other data structure for storing data. In some embodiments, rather than pre-generating a data structure for each independent grouping of assignable ranges of ports, the data structure is created as needed. One example is when a data structure tracking each independent range of ports is created when a new combination of destination IP address, destination network port, network protocol and source IP address of a new session to be established is detected and the created data structure is utilized for subsequent network port requests of the same set of destination IP address, destination network port, network protocol and source IP address.

At 406, the network session is established using the determined available source network port. In some embodiments, establishing the network session includes sending a network packet addressed using the determined source network port. For example, the determined network port is placed in a network packet header as its source network port. Other data (e.g., received in 402) such as source IP address, destination IP address, destination network port, and network protocol identifier may be placed in the network packet as well and sent to the destination communication party. For example, the TCP/IP protocol requires a packet to be addressed using the 4-tuple of <Source-IP, Source-Port, Destination-IP, Destination-Port> that uniquely identifies a network session, the determined source utilized to generate this 4-tuple along with other received information.

In some embodiments, establishing the network session includes adding an entry in a connection table that stores information associated with established connections. For example, a connection hash table includes entries for active network connections for a network device. The connection table entry may include a 5-tuple entry (e.g., includes source IP address, source port, destination IP address, destination port, and protocol identifier) identifying the network session. The connection table entry may also include other connection associated information, session parameters, protocol information, contents of data to be sent, contents of data received via the connection, and any other network information. For example, the connection table includes an entry for the network session that includes a linked list of associated network session information. An example of the connection table includes the Internet protocol control block ("inpcb") hash table of the Berkeley Software Distribution (BSD) Unix operating system.

At 408, the network session is ended. In some embodiments, the network session is ended when the network session is closed, is timed out, encounters an error, or is otherwise ended. In some embodiments, closing the network session includes updating the data structure to reflect that the source network port of the ended network session is available to be utilized.

Figure 5:
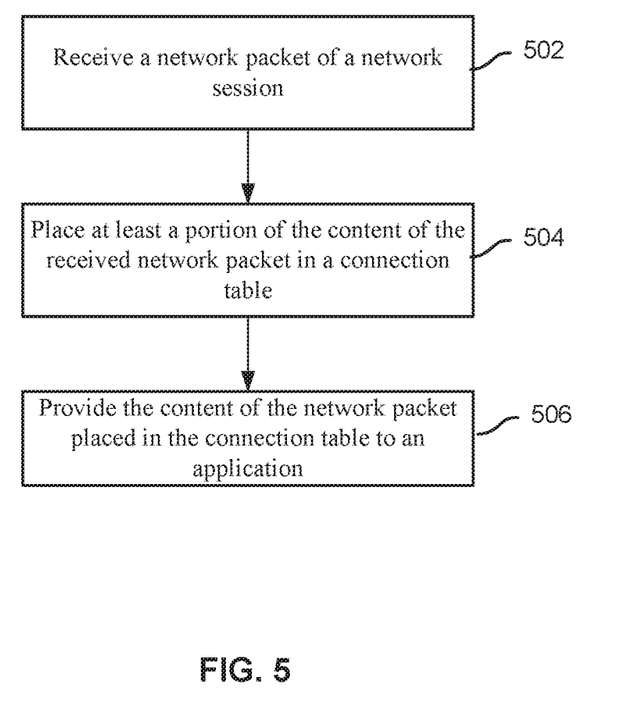
FIG. 5 is a flowchart illustrating an embodiment of a process for receiving a network packet via a network session that has been established using at least a portion of the process of FIG. 4.

FIG. 5 is a flowchart illustrating an embodiment of a process for receiving a network packet via a network session that has been established using at least a portion of the process of FIG. 4. The process of FIG. 5 may be implemented on computer system 100 of FIG. 1, any networked component of FIG. 2, and/or any physical or virtual devices shown in FIG. 3. In some embodiments, the process of FIG. 5 is implemented on a networked client (e.g., user device, personal computer, laptop computer, tablet computer, mobile device, wearable computer, and any other networked device), a server, a firewall, a network proxy, and/or a load balancer.

At 502, a network packet of a network session is received. For example, the network session includes the network session requested in 402 and established in 406 of FIG. 4. In some embodiments, the network packet is received at a source network port identified in 404 of FIG. 4. For example, a recipient of a packet sent in 406 of FIG. 4 sends a response packet to the source IP address and source network port identified in the packet sent in 406 of FIG. 4. In some embodiments, header information of the received network packet is utilized to determine an identifier to be used to locate an entry of a connection table associated with the network session. For example, a 5-tuple session identifier is determined that includes a source IP address (e.g., destination IP address of received network packet), source port (e.g., destination port of received network packet), destination IP address (e.g., source IP address of received network packet), destination port (e.g., source IP address of received network packet), and network protocol identifier.

At 504, at least a portion of the content of the network packet received in 502 is placed in a connection table. In some embodiments, the connection table stores information associated with established connection sessions. For example, a connection hash table includes entries for active network connections for a network device. In some embodiments, the 5-tuple entry associated with the network connection of the received packet is determined using header information of the network packet and the 5-tuple entry is utilized to find an entry of the connection table corresponding to the network session of the received packet. In some embodiments, placing the content in the connection table includes adding the content to the connection table entry of the network connection. For example, an additional linked list entry is added to the connection table entry located using the packet header information. The connection table entry may also include other connection associated information, session parameters, protocol information, contents of data to be sent, contents of data received via the connection, and any other network information. For example, the connection table includes an entry for the network session that includes a linked list of associated network session information. An example of the connection table includes the "inpcb" hash table of the Berkeley Software Distribution (BSD) Unix operating system.

At 506, the content of the network packet placed in the connection table is provided to an application. For example, an application and/or service of the network session of the received packet is provided the content for processing. In some embodiments, the application may forward and/or proxy the provided content to another network node via a different network connection session.

Figure 6:
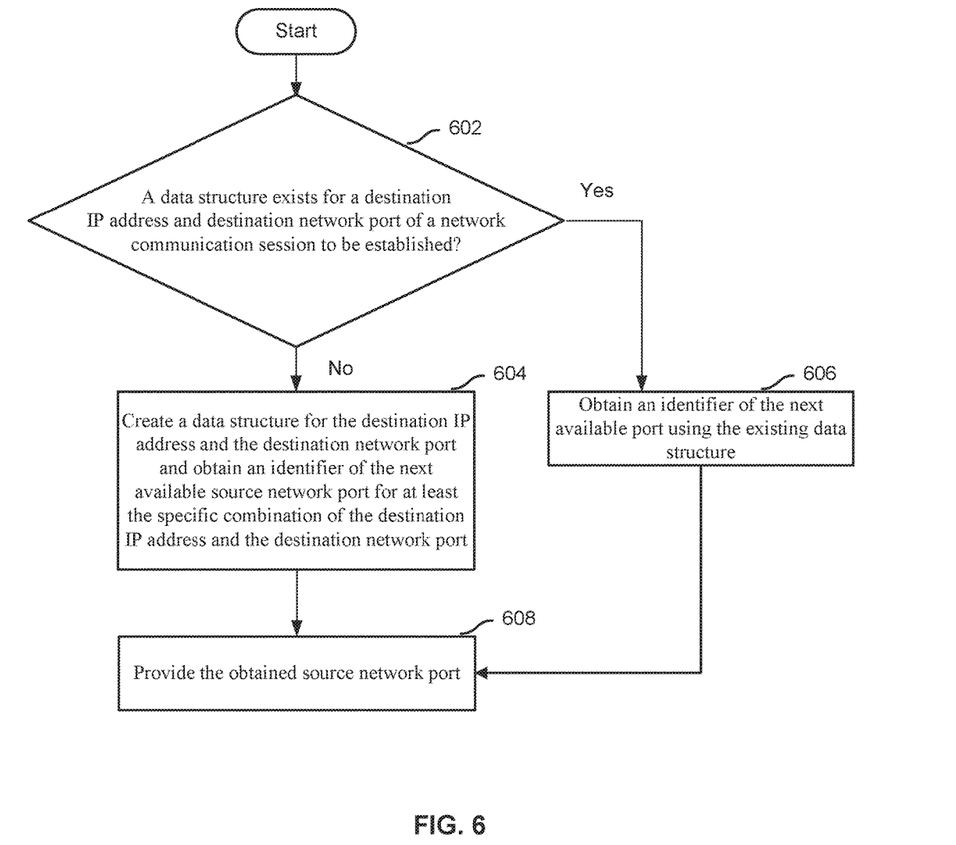
FIG. 6 is a flowchart illustrating an embodiment of a process for determining the next available network port.

FIG. 6 is a flowchart illustrating an embodiment of a process for determining the next available network port. The process of FIG. 6 may be implemented on computer system 100 of FIG. 1, any networked component of FIG. 2, and/or any physical or virtual devices shown in FIG. 3. In some embodiments, the process of FIG. 6 is implemented on a networked client (e.g., user device, personal computer, laptop computer, tablet computer, mobile device, wearable computer, and any other networked device), a server, a firewall, a network proxy, and/or a load balancer. In some embodiments, at least a portion of the process of FIG. 6 is included in 404 of FIG. 4.

At 602, it determined whether a data structure exists for a destination IP address and destination network port of a network communication session to be established. In some embodiments, it is determined whether a data structure exists for at least a destination IP address, destination network port, and a source IP address of a network communication session to be established. In some embodiments, the destination IP address and the destination network port has been determined in 402 of FIG. 4.

In some embodiments, a different data structure that tracks available network ports is maintained for at least each different pair of destination IP address and destination network port (e.g., tracked using separate data structures or different portions of a single data structure). In some embodiments, a different data structure that tracks available network ports is maintained for at least each different combination of destination IP address, destination network port, and source IP address, (e.g., tracked using separate data structures or different portions of a single data structure).

Examples of the data structure include a list, a table, a bitmap, a hash table, a tree, a database, and any other data structure for storing data. In some embodiments, rather than pre-generating a data structure for each independent grouping of available ports, the data structure is created as needed. For example, a data structure tracking each independent grouping of available ports is created when a new combination of destination IP address, destination network port, network protocol and source IP address of a network session to be established is detected and the created data structure is utilized for subsequent network port requests of the same set of destination IP address, destination network port, network protocol and source IP address.

In some embodiments, determining whether the data structure exists includes determining whether any of the existing data structures is for tracking available source network ports for at least the combination of the destination IP address and destination network port. In some embodiments, determining whether the data structure exists includes determining whether an existing portion of an existing data structure is for tracking available source network ports for at least the combination of the destination IP address and destination network port.

If at 602, it determined that the data structure does not exist for a destination IP address and destination network port of the network communication session to be established, at 604, a data structure for the destination IP address and the destination network port is created and an identifier of the next available source network port for at least the specific combination of the destination IP address and the destination network port is obtained. In some embodiments, creating the data structure includes creating a data structure (e.g., creating a new data structure, adding to an existing data structure, reserving a portion of an existing data structure, etc.) specifically for at least the specific combination of the destination IP address and the destination network port. Examples of the created data structure include a list, a table, a bitmap, a hash table, a tree, a database, and any other data structure for storing data. In some embodiments, a portion of the entire range of network ports tracked by the data structure is preconfigured as a not available port because the portion of the network ports has been reserved. For example, specific network ports have been reserved for specific use (i.e., not available to be provided for use from a general pool of available network ports) across all network ports (e.g., reserved in each data structure for every destination IP address and destination network port combination).

In some embodiments, creating the data structure includes receiving a range of available network ports that are available to be tracked and identified as available using the data structure. For example, an identifier of a lower bound port number and an identifier of an upper bound port number are received. In some embodiments, creating the data structure includes receiving a starting identifier of a beginning port to assign. For example, a random number within the range of available ports to be assigned is set as the beginning port. In some embodiments, the obtained identifier of the next available source network port is this beginning port and the data structure is updated to reflect that the beginning port is in use. In some embodiments, the obtained identifier of the next available source network port is preconfigured and the data structure is updated to reflect that this port has been assigned.

If at 602, it determined that the data structure does exist, at 606, an identifier of the next available port is obtained using the existing data structure. For example, the data structure is iteratively searched/traversed to locate an entry that corresponds to an available source network port. In some embodiments, the search is started from a random port number within a range of port numbers. In some embodiments, the search is started from a previously assigned port number. In some embodiments, one or more ports are preconfigured to be not selected using the data structure because these ports have been reserved. For example, specific network ports have been reserved for specific use (i.e., not available to be provided for use from a general pool of available network ports).

The following pseudo code illustrates an example algorithm for obtaining the next available port. In this example, the 5-tuple hash table is a hash-table of all network session connection entries, with 5-tuple as the key and the range of potentially available ports is pmin to pmax (inclusive) and pnext is the largest port number (with wraparound) less than the next port to be used.

```
routine find_source_port [Source-ip, Destination-ip,
Destination-port]
    First-port <- lowest port number that can be assigned
    Last-port <- highest port number that can be assigned.
    lport = first-port
    // find available port between the range
    while lport < Last-port
    begin
        Look up 5-tuple hash table for an exact match of (Source-ip,
        lport,
                Destination-ip, Destination-port)
        if (entry is not found)
        begin
            return (lport)
        end
        Increment lport // Continue searching for a free entry
    end
```

The following pseudo code illustrates another example algorithm for obtaining the next available port. In this example, a bitmap is utilized as the data structure and the range of potentially available ports is pmin to pmax (inclusive) and pnext is the next free port that can be used.
Pseudo Code Function to Create the Data Structure (e.g., 604 of FIG. 6):

```
B, pnext = CreateBitMap(pmin, pmax) -
    - For closed range [pmin, pmax], reserve memory for bitmap B
    - Init pnext to a random number between pmin and pmax
    - return B, pnext
```

Pseudo Code Function to Obtain Next Available Port using the Data Structure (e.g., 606 of FIG. 6):

```
p, pnext = GetFromBitmap(B, pnext) -
    - Find first available port p greater than pnext while wrapping around
      if needed to complete one scan of bitmap B
    - If no port available, return error
    - Mark bit corresponding to port p as used
    - Set pnext to p and return p
```

Pseudo Code Function to Free Port using the Data Structure (e.g., 408 of FIG. 4):

```
PutIntoBitmap(B, p) -
    - Mark bit corresponding to port p as available
```

The following pseudo code illustrates another example algorithm for obtaining the next available port. In this example, a range binary tree is utilized as the data structure and the range of potentially available ports is pmin to pmax (inclusive) and pnext is the next free port that can be used.
Pseudo Code Function to Create the Data Structure (e.g., 604 of FIG. 6):

```
T, pnext = CreateRangeBinaryTree(pmin, pmax) -
    - Create root node T with closed range [pmin, pmax]
    - Init pnext to a random number between pmin and pmax
    - Return T, pnext
```

Pseudo Code Function to Create the Data Structure (e.g., 604 of FIG. 6):

```
p = GetFromRangeBinaryTree(T, pnext) -
    - If T is NULL, return error
    - Find highest node n in T such that it contains smallest number
      greater than pnext (with wraparound)
    - Let range of node n be [p1, p2]
    - If pnext < p1, change range of n to [p1 + 1, p2]
        - If p1 + 1 > p2, delete node n
        - Set pnext to p1 and return p1
    - If pnext = p2 - 1, change range of n to [p1, p2 - 1]
        - If p1 > p2 - 1, delete node n
        - Set pnext to p2 and return p2
    - Create node n1 with range [p1, pnext]
    - Create node n2 with range [pnext + 2, p2]
    - Replace n with n2 and insert n1 as child of n2
    - Set pnext to pnext + 1
    - Return pnext
```

Pseudo Code Function to Obtain Next Available Port using the Data Structure (e.g., 606 of FIG. 6):

```
PutIntoRangeBinaryTree(T, p) -
    - Find highest node n in tree with range [p1, p2] such that
      p = p1 - 1 or p = p2 + 1
    - If node n exists, change range of n to [min(p1, p), max(p2, p)]
    - Else create node n with range [p, p]
    - Let range of node n be [p3, p4]
    - Find node npred that is predecessor of n in subtree of n
    - Let range of npred be [p5, p6]
    - If p6 + 1 = p3, delete npred and update range of n to [p5, p4]
    - Let range of node n be [p7, p8]
    - Find node nsucc that is successor of n in subtree of n
    - Let range of nsucc be [p9, p10]
    - If p8 + 1 = p9, delete nsucc and update range of n to [p7, p10]
```

At 608, the obtained source network port is provided. For example, the provided source network port is received as determined available source network port in 404 and utilized to establish the network session in 406 of FIG. 4.

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method for managing network ports, comprising:
receiving network session identification information associated with a destination IP address and a destination network port; and using a processor to determine for a new session to be established for a source IP address, an available source network port based on the destination IP address and the destination network port, wherein the available source network port is identified as available to be assigned to the new session for the source IP address including by determining that for at least a combination of the destination IP address and the destination network port, the available source network port has not been already assigned for the source IP address;

wherein a same port number of the determined to be available source network port for the new session to be established for the source IP address is concurrently assigned to a different network session for the same source IP address but for a different destination IP address or a different destination network port.

2. The method of claim 1, wherein at least one entry of one or more data structures identifies that for the source IP address, the available source network port has been already assigned to the different network session for the different destination IP address or the different destination network port.

3. The method of claim 1, wherein the available source network port is selected from a group of source network ports identified using one or more data structures and the group of source network ports is identified as not already being assigned to a plurality of data structure entries for the destination IP address and the destination network port.

4. The method of claim 1, wherein a selected one of one or more data structures utilized to determine the available source network port tracks available source network ports specific to only the destination IP address and the destination network port and the selected one data structure was selected among the one or more data structures that are each associated with a different set of destination IP address and destination network port and the selected one data structure includes a plurality of entries for the destination IP address and the destination network port.

5. The method of claim 1, further comprising establishing a network session using the determined available source network port.

6. The method of claim 1, wherein the available source network port was determined using one or more data structures based on the destination IP address and the destination network port and at least one of the one or more data structures is additionally based on the source IP address.

7. The method of claim 1, wherein the available source network port was determined using one or more data structures based on the destination IP address and at least one of the one or more data structures is additionally based on a network protocol.

8. The method of claim 1, wherein the network session identification information is associated with forwarding network content via a network load balancer.

9. The method of claim 1, wherein the network session identification information was determined using a request received from a client via a network.

10. The method of claim 1, wherein the network session identification information identifies the new network session to be established.

11. The method of claim 1, wherein determining the available source network port includes creating at least one of one or more data structures specifically for at least the destination IP address and the destination network port.

12. The method of claim 1, wherein determining the available source network port includes identifying the available source network port from a range of network ports.

13. The method of claim 1, wherein the available source network port was determined using one or more data structures based on the destination IP address and at least one of the one or more data structures includes a bitmap.

14. The method of claim 13, wherein the range of network ports excludes one or more reserved ports preconfigured to be reserved.

15. The method of claim 1, wherein the available source network port was determined using one or more data structures based on the destination IP address and at least one of the one or more data structures is a range binary tree.

16. The method of claim 1, wherein when a network session of the available source network port ends, at least one of one or more data structures is updated to reflect that a port number of the available source network port is available for use.

17. A system for managing network ports, comprising:
a processor configured to:
receive network session identification information associated with a destination IP address and a destination network port; and
determine for a new session to be established for a source IP address, an available source network port based on the destination IP address and the destination network port, wherein the available source network port is identified as available to be assigned to the new session for the source IP address including by determining that for at least a combination of the destination IP address and the destination network port, the available source network port has not been already assigned for the source IP address;
wherein a same port number of the determined to be available source network port for the new session to be established for the source IP address is allowed to be concurrently assigned to a different network session for the same source IP address but for a different destination IP address or a different destination network port; and
a memory coupled to the processor and configured to provide the processor with instructions.

18. The system of claim 17, wherein the available source network port is selected from a group of source network ports identified using one or more data structures and the group of source network ports is identified as not already being assigned to a plurality of data structure entries for the destination IP address and the destination network port.

19. The system of claim 17, wherein a selected one of one or more data structures utilized to determine the available source network port tracks available source network ports specific to only the destination IP address and the destination network port and the selected one data structure was selected among the one or more data structures that are each associated with a different set of destination IP address and destination network port and the selected one data structure includes a plurality of entries for the destination IP address and the destination network port.

20. A computer program product for managing network ports, the computer program product being embodied in a non-transitory computer readable storage medium and comprising computer instructions for:
receiving network session identification information associated with a destination IP address and a destination network port; and
determining for a new session to be established for a source IP address, an available source network port based on the destination IP address and the destination network port, wherein the available source network port is identified as available to be assigned to the new session for the source IP address including by determining that for at least a combination of the destination IP address and the destination network port, the available source network port has not been already assigned for the source IP address;

wherein a same port number of the determined to be available source network port for the new session to be established for the source IP address is allowed to be concurrently assigned to a different network session for the same source IP address but for a different destination IP address or a different destination network port.

* * * * *